(12) United States Patent
Graf et al.

(10) Patent No.: US 6,908,202 B2
(45) Date of Patent: Jun. 21, 2005

(54) BULK DIFFUSER FOR FLAT PANEL DISPLAY

(75) Inventors: John F. Graf, Ballston Lake, NY (US); Eugene G. Olczak, Glenville, NY (US); Grant Hay, Evansville, IN (US); Ramesh Hariharan, Cambridge, MA (US); Philippe Schottland, Evansville, IN (US)

(73) Assignee: General Electric Company, Schenectady, NY (US)

( * ) Notice: Subject to any disclaimer, the term of this patent is extended or adjusted under 35 U.S.C. 154(b) by 77 days.

(21) Appl. No.: 10/065,319

(22) Filed: Oct. 3, 2002

(65) Prior Publication Data

US 2004/0066645 A1 Apr. 8, 2004

(51) Int. Cl.⁷ .............................................. G01D 11/28
(52) U.S. Cl. ........................... 362/26; 362/31; 362/558
(58) Field of Search .................... 362/26, 31, 558–561; 349/64, 65, 112; 359/559, 601, 49; 428/327, 332, 338, 412; 523/223

(56) References Cited

U.S. PATENT DOCUMENTS

| | | | |
|---|---|---|---|
| 4,152,618 A | * 5/1979 | Abe et al. .................... 313/116 |
| 4,220,583 A | 9/1980 | Mark | |
| 4,252,916 A | 2/1981 | Mark | |
| 4,368,303 A | * 1/1983 | McDaniel .................... 526/106 |
| 5,394,255 A | * 2/1995 | Yokota et al. ................. 349/64 |
| 5,422,756 A | 6/1995 | Weber ......................... 359/487 |
| 5,528,720 A | 6/1996 | Winston et al. .............. 385/146 |
| 5,594,561 A | 1/1997 | Blanchard .................... 349/59 |
| 5,825,542 A | 10/1998 | Cobb, Jr. et al. ........... 359/487 |
| 5,949,506 A | 9/1999 | Jones et al. .................. 349/112 |
| 5,963,284 A | 10/1999 | Jones et al. .................. 349/112 |
| 5,999,281 A | 12/1999 | Abbott et al. ................. 359/15 |
| 6,002,829 A | 12/1999 | Winston et al. .............. 385/146 |
| 6,018,419 A | 1/2000 | Cobb, Jr. et al. ........... 359/500 |
| 6,044,196 A | 3/2000 | Winston et al. .............. 385/146 |
| 6,111,696 A | 8/2000 | Allen et al. .................. 359/495 |
| 6,160,663 A | 12/2000 | Merrill et al. ............... 359/500 |
| 6,208,466 B1 | * 3/2001 | Liu et al. ..................... 359/584 |
| 6,221,543 B1 | 4/2001 | Guehler et al. ................. 430/7 |
| 6,280,808 B1 | 8/2001 | Fields et al. ................ 428/64.1 |
| 6,322,236 B1 | 11/2001 | Campbell et al. ............ 362/333 |
| 6,327,091 B1 | 12/2001 | Agano ......................... 359/619 |

(Continued)

FOREIGN PATENT DOCUMENTS

| | | | |
|---|---|---|---|
| EP | 0 604 130 A | 6/1994 | |
| EP | 0 999 033 A2 | 10/2000 | ........... B29C/47/14 |
| WO | WO 98/33006 | 7/1998 | |
| WO | WO 00/70399 | 11/2000 | |
| WO | WO 01/31370 | 5/2001 | ............ G02B/5/30 |
| WO | WO 01/31371 A1 | 5/2001 | ............ G02B/5/30 |
| WO | WO 02/04858 A2 | 1/2002 | |

OTHER PUBLICATIONS

Database WPI, Section Ch, Week 199503, Derwent Publications Ltd., London, GB; AN 1995-019419, SP002263506 & JP 06 306266 A (Nippon Steel Chem Co), (Nov. 1, 1994) abstract.

(Continued)

*Primary Examiner*—Sandra O'Shea
*Assistant Examiner*—Mark Tsidulko
(74) *Attorney, Agent, or Firm*—Foley & Lardner LLP

(57) ABSTRACT

The invention features a bulk light diffuser material. The bulk light diffuser material may be a sheet or film comprising about 95 to about 99.8 percent by weight of polycarbonate and about 0.2 to about 2.5 percent by weight of a particulate light diffusing component, based on the total weight of the polycarbonate and the light diffusing particles. The sheet material has a percent transmittance of at least 70% and a haze of at least 10% measured according to the American Society for Testing and Materials (ASTM) standard D 1003.

30 Claims, 10 Drawing Sheets

U.S. PATENT DOCUMENTS

| | | |
|---|---|---|
| 6,335,999 B1 | 1/2002 | Winston et al. ............. 385/146 |
| 6,361,180 B1 | 3/2002 | Iimura ......................... 362/31 |
| 2001/0005243 A1 | 6/2001 | Yamaguchi ................... 349/61 |
| 2001/0010884 A1 | 8/2001 | Guehler et al. ................. 430/7 |
| 2001/0015780 A1 | 8/2001 | Yamaguchi ................. 349/112 |
| 2001/0017674 A1 | 8/2001 | Yamaguchi ................... 349/61 |
| 2001/0019240 A1 | 9/2001 | Takahashi ................... 313/483 |
| 2001/0019378 A1 | 9/2001 | Yamaguchi ................... 349/61 |
| 2001/0022997 A1 * | 9/2001 | Honda et al. ............... 428/1.31 |
| 2001/0036546 A1 | 11/2001 | Kaytor et al. ............ 428/316.6 |
| 2001/0055078 A1 | 12/2001 | Lee et al. ...................... 349/65 |
| 2002/0001183 A1 | 1/2002 | Shigehiro ..................... 362/23 |
| 2002/0012248 A1 | 1/2002 | Campbell et al. ........... 362/331 |
| 2002/0024803 A1 | 2/2002 | Adachi et al. |
| 2002/0061178 A1 | 5/2002 | Winston et al. ............. 385/133 |

OTHER PUBLICATIONS

Database WPI, Section Ch, Week 199802, Derwent Publications Ltd., London, GB; AN 1998–014910, XP002263504 & JP 09 279000 A (Teijin Kasei Ltd), (Oct. 28, 1997) abstract.

Database WPI, Section Ch, Week 199021, Derwent Publications Ltd., London, GB; AN 1990–159122, SP002263505 & JP 02 099560 A (Teijin Kasei Ltd), (Apr. 11, 1990) abstract.

International Search Report, PCT/US 03/24843, Jul. 29, 2003.

Database WPI, Section Ch, Week 200236, Derwent Publications Ltd., London, GB; AN 1998–141149, XP002263499 & JP 03 283761 B (Teijin Kasei Ltd), (May 20, 2002) abstract.

Database WPI, Section Ch, Week 199817, Derwent Publications Ltd., London, GB; AN 1998–189474, XP002263502 & JP 10 046018 A (Idemitsu Petrochem Co Ltd), (Feb. 17, 1998) abstract.

Database WPI, Section Ch, Week 199522, Derwent Publications Ltd., London, GB; AN 1995–167379, XP002263503 & JP 07 090167 A (Teijin Ltd), (Apr. 4, 1995) abstract.

Database WPI, Section Ch, Week 199131, Derwent Publications Ltd., London, GB; AN 1991–225864, XP002263500 & JP 03 143950 A (Nippon Ge Plastics), (Jun. 19, 1991) abstract.

Database WPI, Section CH, Week 199410, Derwent Publications Ltd., London, GB; AN 1994–080118, SP00226350 & JP 06 032973 A (Mitsubishi Gas Chem Co Inc), (Feb. 8, 1994) abstract.

* cited by examiner

○ 0.2% 2.4 micron PMMA □ 0.2% 2 micron Tospearl
● 2.2% 2.4 micron PMMA ■ 2.2% 2 micron Tospearl
△ 0.2% 5 micron PMMA ◇ 0.2% 4.5 micron Tospearl
▲ 2.2% 5 micron PMMA ■ 2.2% 4.5 micron Tospearl

BULK DIFFUSER FOR FLAT PANEL DISPLAY

BACKGROUND OF THE INVENTION

This invention relates to optical sheet material and, more specifically, to such sheet material characterized by bulk diffusion of light.

In backlight computer displays or other display systems, optical films or sheet material are commonly used to direct, diffuse or polarize light. For example, in backlight displays, brightness enhancement films use prismatic structures on the surfaces thereof to direct light along a viewing axis (i.e., an axis normal to the display). This enhances the brightness of the light viewed by the user of the display and allows the system to consume less power in creating a desired level of on-axis illumination. Such films can also be used in a wide range of other optical designs, such as in projection displays, traffic signals, and illuminated signs.

In current displays systems, for example in Liquid Crystal Displays (LCD), it is desirable to have diffusing components. Examples of the utility of diffusing components include (but are not limited to) masking artifacts, such as seeing electronic components located behind the diffuser film, improved uniformity in illumination and increased viewing angle. In a typical LCD display, diffusion of light is introduced into the backlight assembly by adding separate films (i.e., a stack) that are comprised of a non-diffusing substrate to which a highly irregular, diffusing surface treatment is applied or attached. It is thus desirable to generate diffuse light with out the added cost of separate films.

SUMMARY OF THE INVENTION

The invention features a bulk light diffuser material. The bulk light diffuser material comprises about 95 to about 99.8 percent by weight of polycarbonate and about 0.2 to about 2.5 percent by weight of a particulate light diffusing component, based on the total weight of the polycarbonate and the light diffusing particles. The sheet material has a percent transmittance of at least 70% and a haze of at least 10% measured according to the American Society for Testing and Materials (ASTM) standard D 1003.

In another aspect of the invention, a backlight display device comprises an optical source for generating light; a light guide for guiding the light therealong including a reflective surface for reflecting the light out of the light guide; and the aforesaid bulk light diffuser material as a sheet material receptive of the light from the reflective surface.

DETAILED DESCRIPTION OF THE INVENTION

Figure 1:
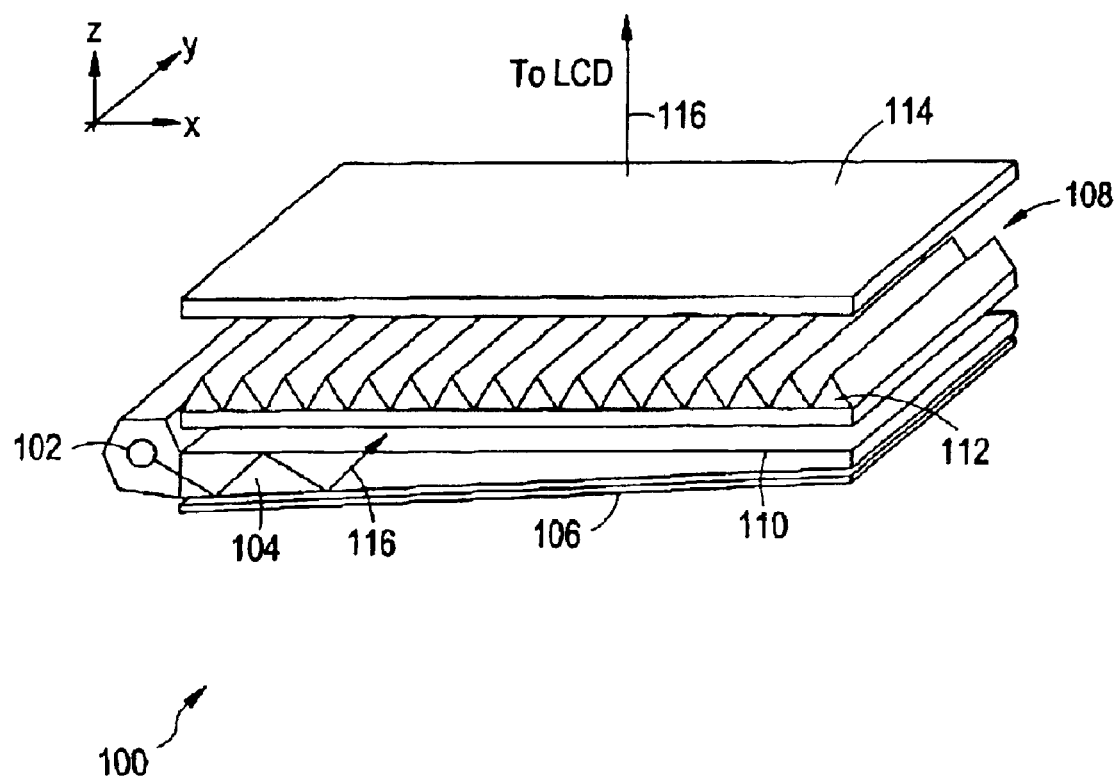
FIG. 1 is a cross sectional view of a backlight display device including an optical substrate or optical sheet material.
Figure 8:
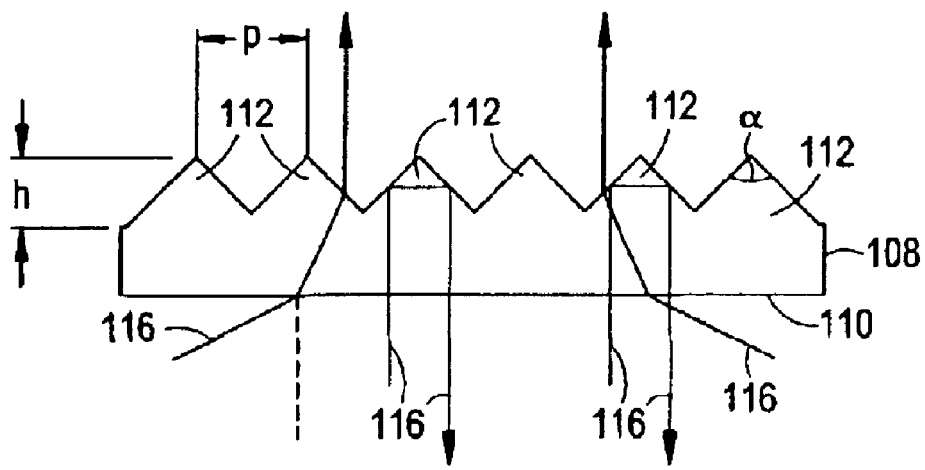
FIG. 8 is a cross sectional view of an optical substrate having prismatic structures of the surface thereof.
Figure 10:
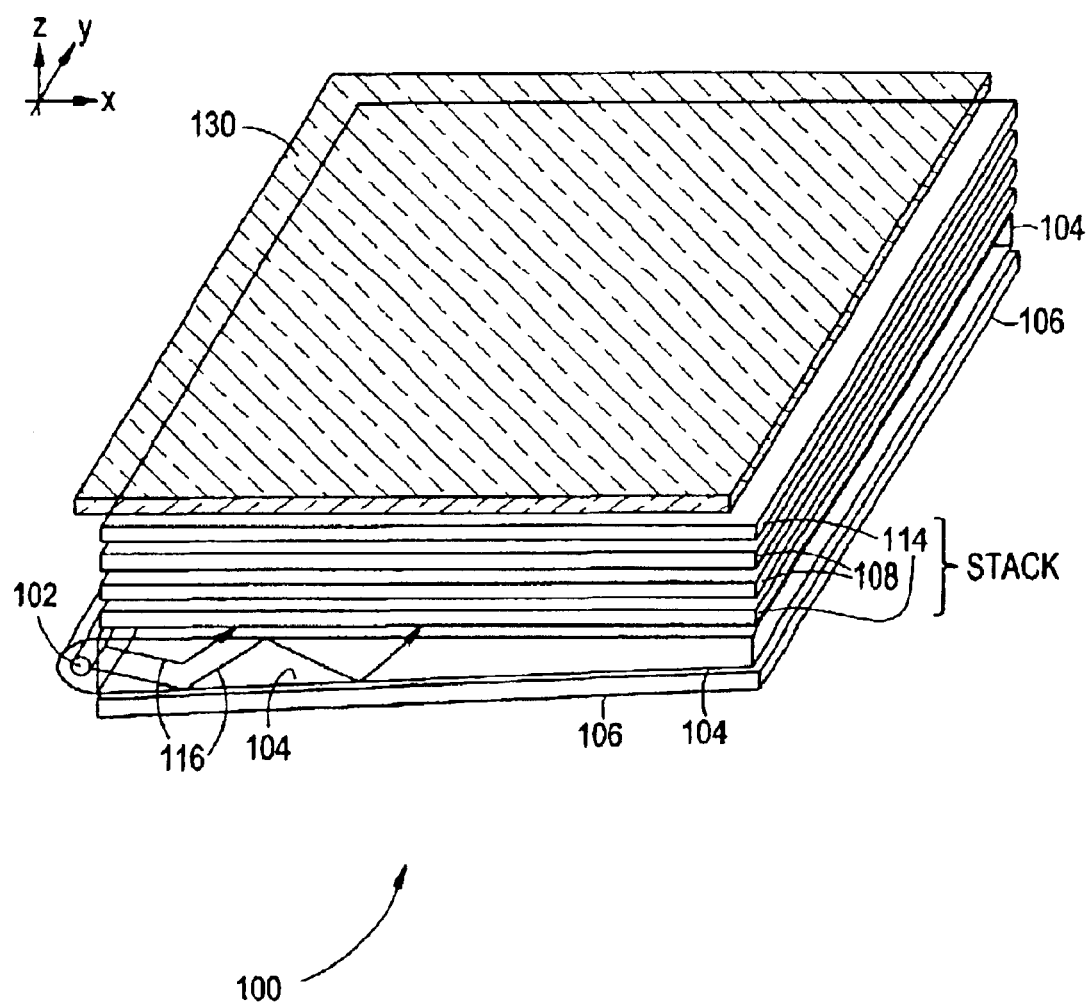
FIG. 10 is a three dimensional view of a backlight display device including a stack of optical substrates.

In FIG. 1 a perspective view of a backlight display 100 device is shown. The backlight display device 100 comprises an optical source 102 for generating light 116. A light guide 104 guides the light 116 therealong by total internal reflection. A reflective device 106 positioned along the light guide 104 reflects the light 116 out of the light guide 104. A first optical substrate 108 positioned above the light guide 104 is receptive of the light 116 from the light guide 104. The first optical substrate 108 comprises, on one side thereof, a planar surface 110 and on a second, opposing side thereof, a prismatic surface 112 (FIG. 8) or may comprise opposing planar surfaces 110 or opposing prismatic surfaces 112. The opposing surfaces may also include a matte finish, for example a surface replicated from a sand blasted, laser machined, milled or electric discharged machine master as well as the planar and prismatic surfaces. The first optical substrate 108 is receptive of the light 116 and acts to turn the light 116 in a direction that is substantially normal to the first optical substrate 108 along a direction z as shown. The light 116 is then directed to a second optical substrate 114 located above the first optical substrate 108 to provide diffusion of the light 116. The second optical substrate 114, which may be sheet material, is receptive of the light 116 from the first optical substrate 108. The light 116 proceeds from the second optical substrate 114 to a liquid crystal display (LCD) 130 (FIG. 10). It will be appreciated that the second optical substrate may also include the aforesaid planar and prismatic surfaces 110, 112.

Figure 11:
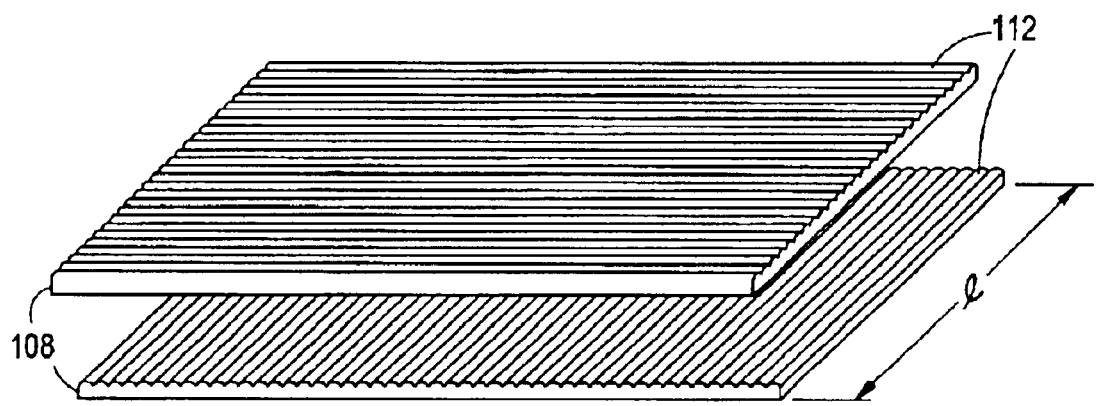
FIG. 11 is a three dimensional view of optical substrates oriented such that the direction of prismatic surfaces thereon are positioned at an angle with respect to one another.

As best understood from FIG. 10, the backlight display device 100 may include a plurality of optical substrates 108, 114 arranged in a stack as shown. Furthermore, the prismatic surfaces 112 of the optical substrates 108 may be oriented such that the direction of the prismatic surfaces 112 are positioned at an angle with respect to one another, e.g., 90 degrees (FIG. 11). Still further, it will be appreciated that the prismatic surfaces 112 of the optical substrates 108 have a peak angle, $\alpha$, a height, h, a pitch, p, and a length, l which may have prescribed values or may have values which are randomized or at least psuedo-randomized.

Figure 4:
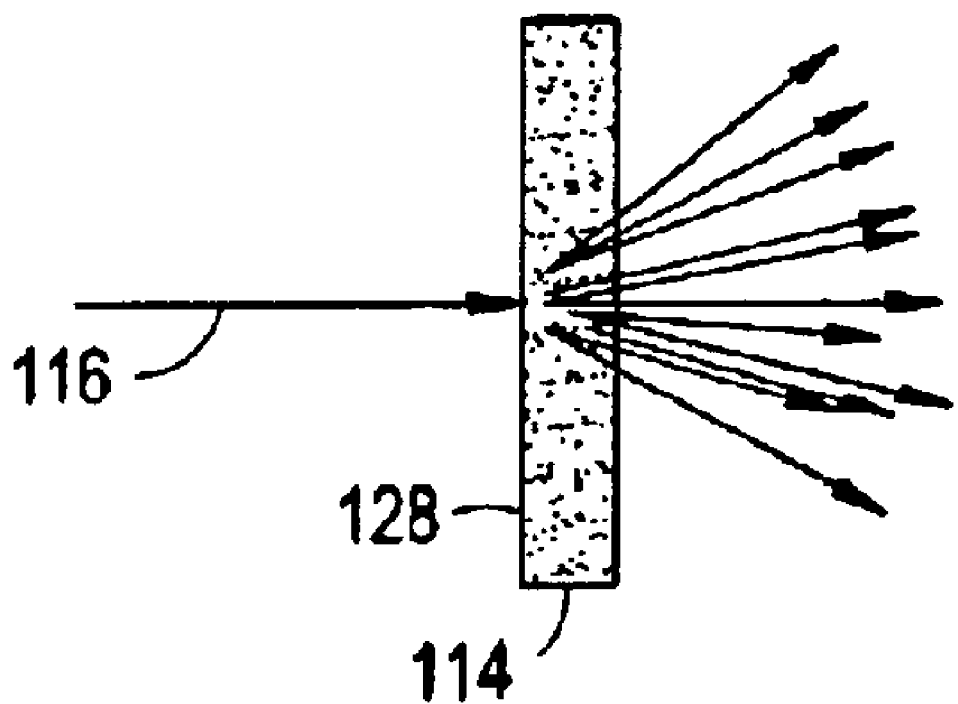
FIG. 4 is a cross sectional view of an optical substrate or optical sheet material receptive of light and diffusing the light emanating therefrom.

Haze is the scattering or diffusion of light as light passes through a transparent material. Haze can be inherent in the material, a result of a formation or molding process, or a result of surface texture (e.g., prismatic surfaces). By adding light diffusing particles 128 (FIG. 4), having a characteristic dimension of about 1 to 10 micrometers, to the second optical substrate 114, the diffusion of light emanating therefrom may be improved. The light diffusing particles 128 may be round or irregular in shape, and have a refractive index different from that of the second optical substrate 114. Typical refractive indices of the light diffusing particles 128 are in the range of about 1.4 to about 1.7 and that of the second optical substrate 114 in the range of about 1.45 to about 1.65. The light diffusing particles 128 may be randomly, or at least pseudo-randomly, distributed or oriented in the optical substrate 114, or may be aligned in some deterministic fashion.

Suitable light diffusing particles may comprise organic or inorganic materials, or mixtures thereof, and do not significantly adversely affect the physical properties desired in the polycarbonate, for example impact strength or tensile strength. Examples of suitable light diffusing organic materials include poly(acrylates); poly (alkyl methacrylates), for example poly(methyl methacrylate) (PMMA); poly(tetrafluoroethylene) (PTFE); silicones, for example hydrolyzed poly(alkyl trialkoxysilanes) available under the trade name TOSPEARL® from GE Silicones; and mixtures comprising at least one of the foregoing organic materials, wherein the alkyl groups have from one to about twelve carbon atoms. Examples of suitable light diffusing inorganic materials include materials comprising antimony, titanium, barium, and zinc, for example the oxides or sulfides of the foregoing such as zinc oxide, antimony oxide and mixtures comprising at least one of the foregoing inorganic materials.

Figure 2:
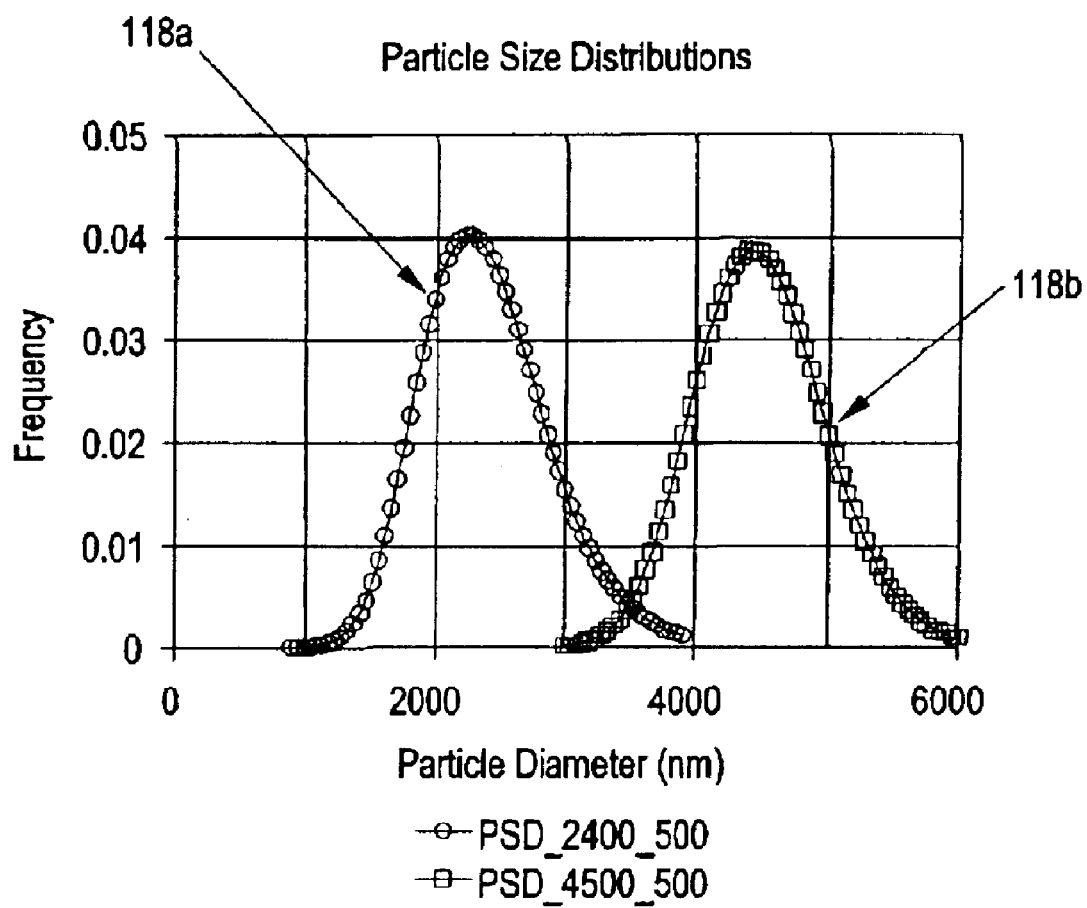
FIG. 2 is a graphical representation of two particle size distributions of light diffusing particles introduced into an optical substrate or optical sheet material.

FIG. 2 shows two light diffusing particle size distributions 118a, 118b wherein the frequency of the light diffusing particles is a function of particle diameter (or some characteristic dimension). In a first light diffusing particle size distribution 118a the average particle size is 2.4 micrometers with a standard deviation of 500. In a second light diffusing particle size distribution 118b the average particle size is 4.5 micrometers with a standard deviation of 500.

Figure 3:
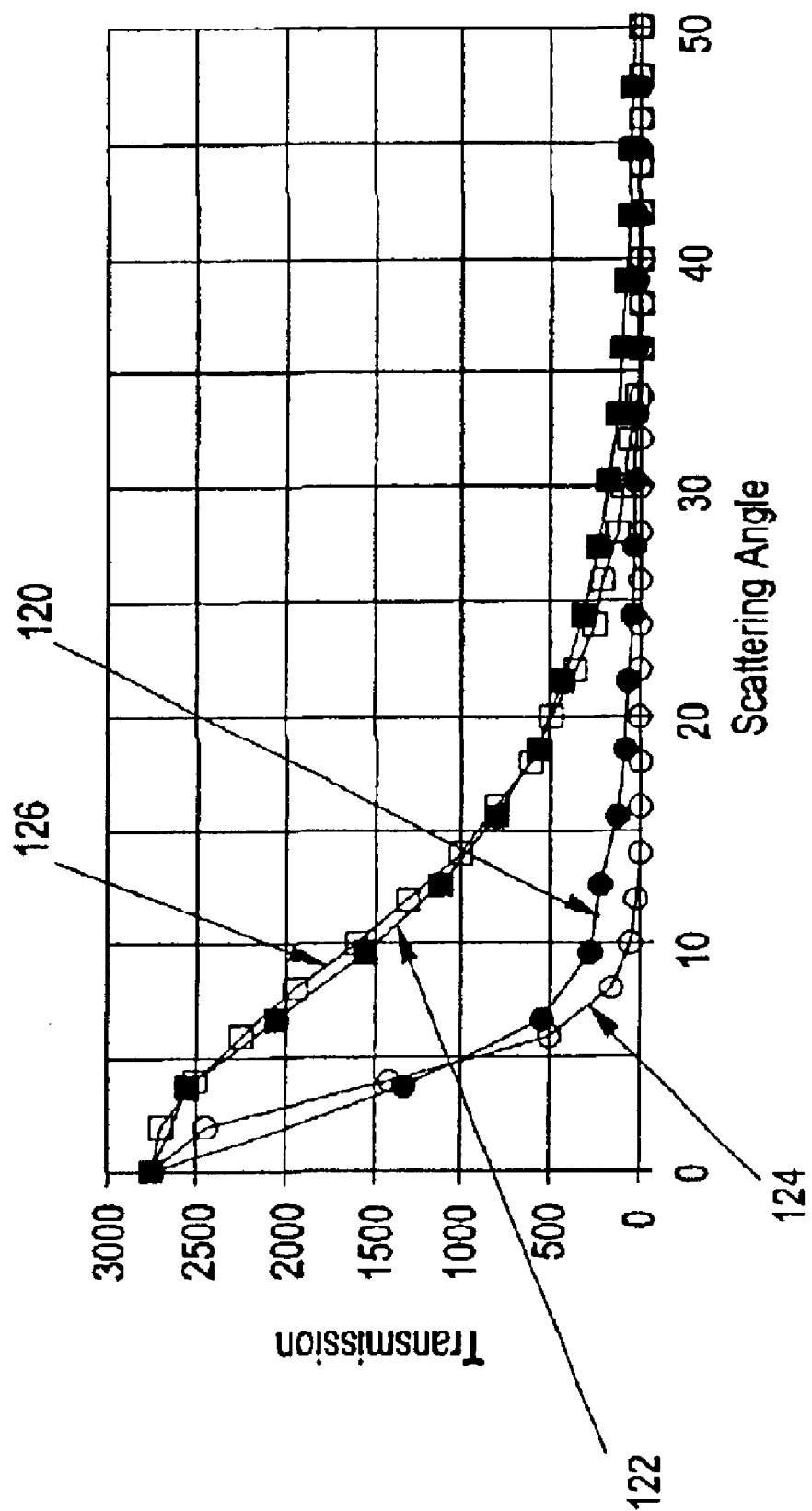
FIG. 3 is a graphical representation of the theoretical transmission of light through a polycarbonate film or optical sheet material with diffuser particles introduced thereto according to the particle size distributions of FIG. 2, as a function of scattering angle as compared to prior art polycarbonate film.

FIG. 3 shows a graphical representation of the theoretical transmission of light 120, 122 (luminance in $Cd/m^2$) at 560 nm through a 0.127 mm thick polycarbonate film with light diffusing particles, having a refractive index of 1.49, and a concentration of 1.8% (122) and 1.5% (120) introduced thereinto according to the particle size distributions of FIG. 2, as a function of scattering angle, as compared to the actual transmission of light 124, 126 through two prior art polycarbonate films. As can be seen from FIG. 3 by selecting a proper refractive index, mean particle size and particle concentration, a transmission can be found that substantially follows that of actual transmission.

Table 1 shows data for two types of light diffusing particles suspended in a 0.178 mm thick polycarbonate film with a refractive index of 1.59. Typical films are about 0.025 to 0.5 mm in thickness but could be thicker or thinner if the application required it. The first light diffusing particle is a polymer comprised of poly(methyl methacrylate), and the second is a polymer comprising hydrolyzed poly(alkyl trialkoxysilane), or a mixture thereof, where "alkyl" is defined as $C_1$–$C_{12}$ alkyl, preferably methyl. With no light diffusing particles added to the polycarbonate film the integrated reflection is 9.7% and the integrated transmission is 88.4%. As can be seen from Table 1, in the first exemplary particle size and concentration, by maintaining a constant mean particle diameter (2.4 micrometers), standard deviation (0.24 micrometers) and particle concentration (0.2%), while changing the refractive index of the light diffusing particles from 1.49 to 1.43, the integrated reflection increases from 9.8% to 9.9%, the integrated transmission diminishes from 88.3% to 87.8%. In the second exemplary particle size and concentration, by maintaining a constant mean particle diameter (2.4 micrometers), standard deviation (0.24 micrometers) and particle concentration (2.2%), while changing the refractive index of the light diffusing particles from 1.49 to 1.43, the integrated reflection increases from 11.0% to 16.5% and the integrated transmission diminishes from 86.3% to 78.9%. Thus, lowering the refractive index of the added particulate matter from 1.49 to 1.43 relative to that of polycarbonate film refractive index of 1.59 reduces transmission and increases the reflection of light through the polycarbonate film.

As can also be seen from Table 1, by increasing the light diffusing particle concentration from 0.2% to 2.2% for a given particle type, where the refractive index of the light diffusing particles is constant, the haze for PMMA increases from 34% to 98% while for TOSPEARL® the haze increases from 44% to 99%. Thus, increasing the concentration of the light diffusing particles increases the haze of the polycarbonate film. In summary, Table 1 illustrates that PMMA is a good candidate for use as the added light diffusing particles because its addition to the polycarbonate film has the minimal reduction in the integrated transmission from 88.4% to 86.3% while at the same time achieving a percent haze value of 98%.

TABLE 1

| Light Diffusing Material | Refractive Index (n) | Particle Size (diameter in micrometers) | Particle Conc (weight %) | Integrated Reflection (%) | Integrated Transmission (%) | Haze (%) |
|---|---|---|---|---|---|---|
| None | 1.59 | | 0.0% | 9.7% | 88.4% | 0% |
| PMMA | 1.49 | 2.4 | 0.2% | 9.8% | 88.3% | 34% |
| PMMA | 1.49 | 2.4 | 2.2% | 11.0% | 86.3% | 98% |
| TOSPEARL ® | 1.43 | 2.4 | 0.2% | 9.9% | 87.8% | 44% |
| TOSPEARL ® | 1.43 | 2.4 | 2.2% | 16.5% | 78.9% | 99% |

Figure 5:
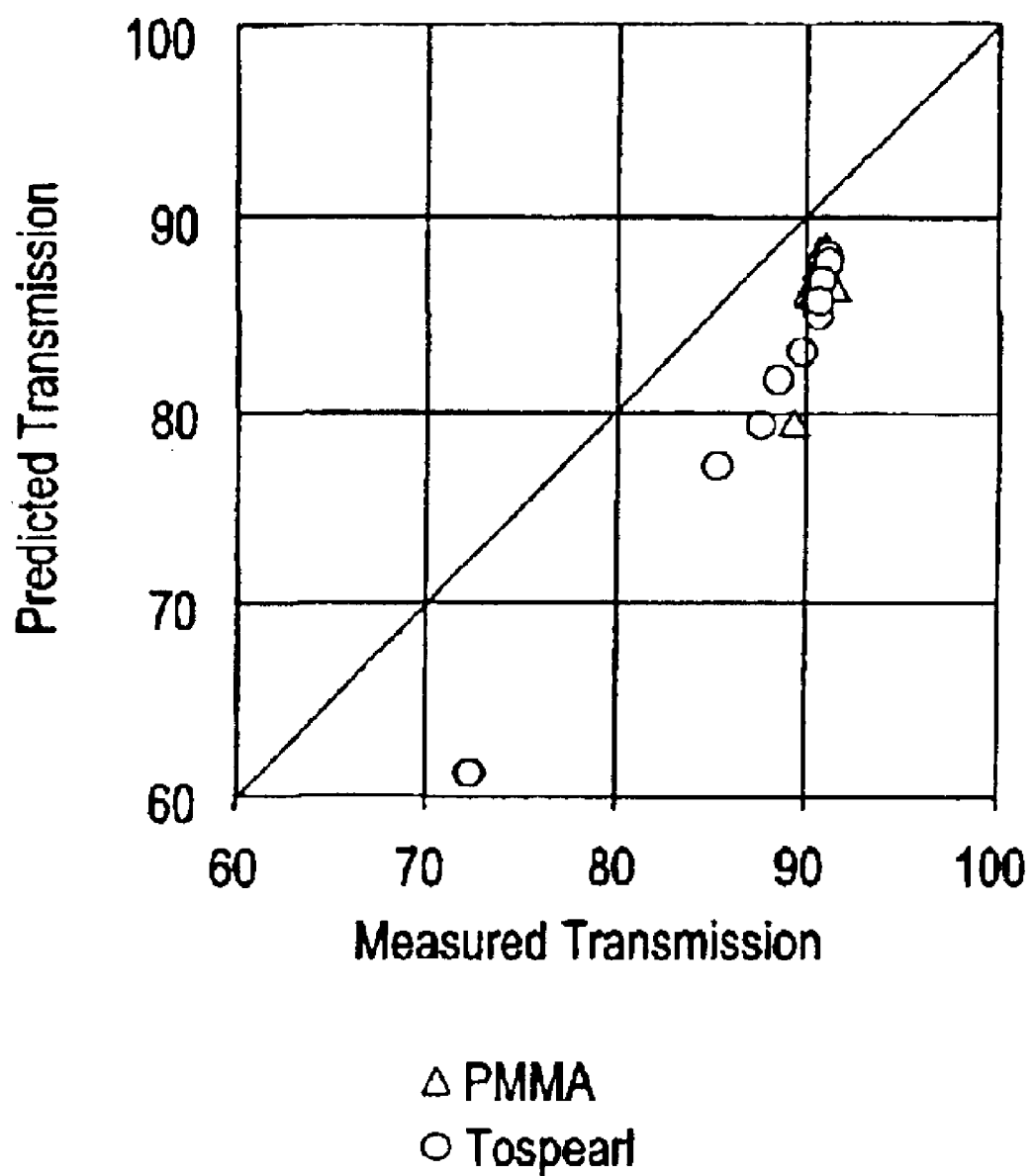
FIG. 5 is a graphical representation of experimental results of the predicted transmission of light vs the measured transmission of light for PMMA and TOSPEARL® particles distributed in a polycarbonate film or optical sheet material.
Figure 6:
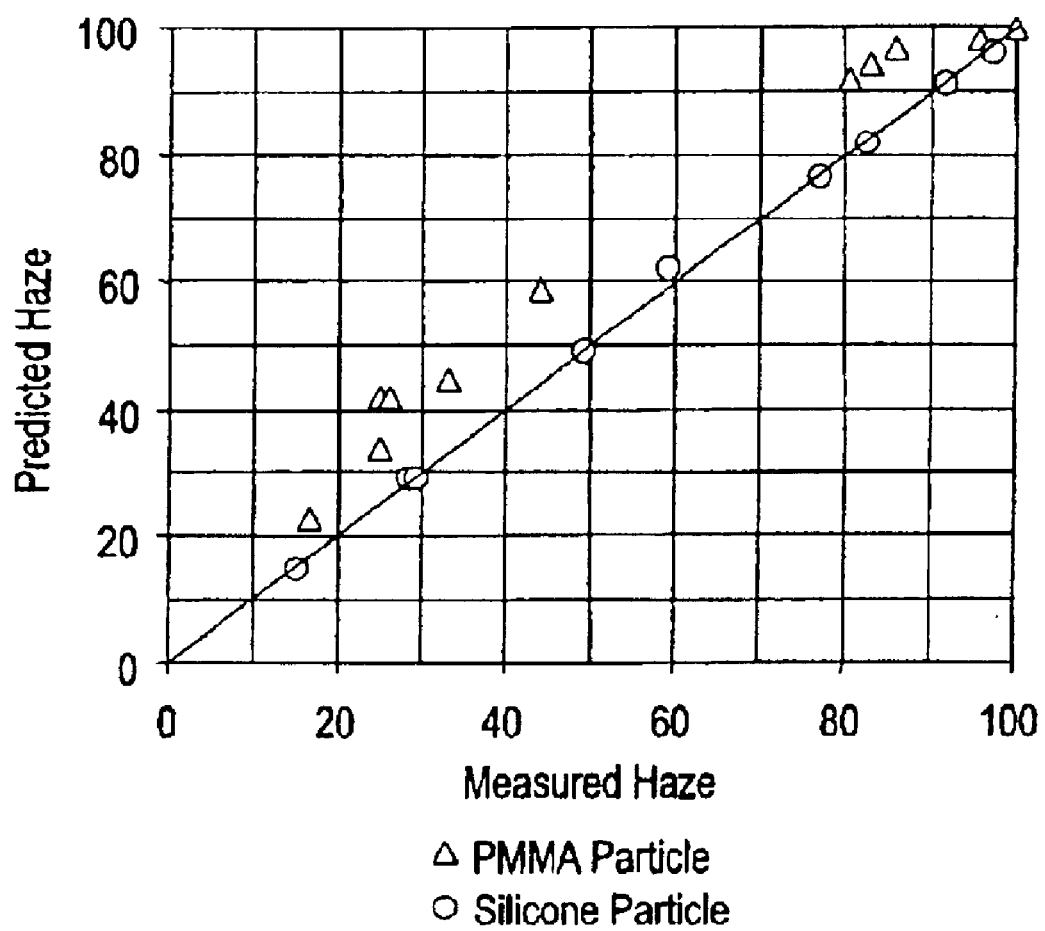
FIG. 6 is a graphical representation of experimental results of the predicted haze vs the measured haze for PMMA and TOSPEARL® particles distributed in a polycarbonate film or optical sheet material.

Referring now to FIGS. 5 and 6 experimental results for predicted vs measured percent transmission of light and percent haze are shown. In FIG. 5 the PMMA particles (Δ) and the TOSPEARL® particles (○) show a reasonably good equivalence between the measured and predicted transmission values.

In FIG. 6, the predicted and measured percent haze is calculated from $$\% \text{ Haze} = 100 \times \frac{\text{Total Diffuse Transmission}}{\text{Total Transmission}} \quad (1)$$

where total transmission is the integrated transmission and the diffuse transmission is the light transmission that is scattered by the film as defined by ASTM D 1003. As seen in FIG. 6, the PMMA particles (Δ) show a reasonably good equivalence between the measured and predicted values of percent haze, whereas the TOSPEARL® particles (○) show a very near or substantial equivalence between the measured and predicted values of percent haze. However, as noted above in Table 1, TOSPEARL® shows a higher integrated reflection for both particle size distributions than that of PMMA. Thus, for applications that require higher reflection TOSPEARL® may be preferred.

Figure 7:
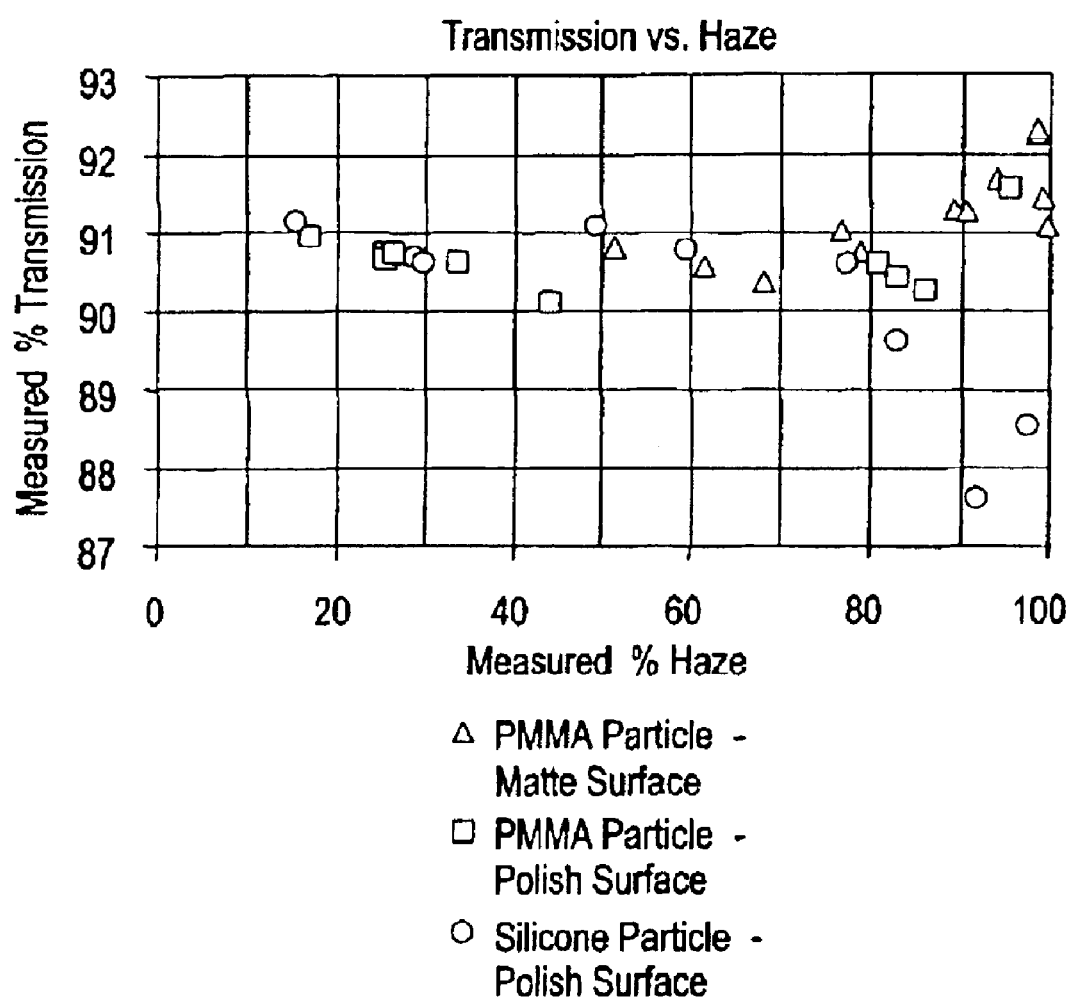
FIG. 7 is a graphical representation of the measured percent transmission of light vs the measured percent haze for matte surface and polished surface PMMA and polished surface TOSPEARL® particles distributed in a polycarbonate film or optical sheet material.

FIG. 7 is a graphical representation of the experimental measured percent transmission of light through a polycarbonate film relative to their measured percent haze thereof for matte surface (Δ) and polished surface (■) PMMA particles and polished surface (○) TOSPEARL® particles distributed in the polycarbonate film. The refractive index difference between the polycarbonate film and the PMMA particles is about 0.1, which is optimum for high haze and high transmission values. However, the refractive index difference between the polycarbonate film and the TOSPEARL® particles is about 0.16 which is larger than that between PMMA and the polycarbonate, leading to lower transmissions for the high haze samples. In FIG. 7, several of the PMMA particles (both matte and polished surfaces) show a transmission of greater than 90% and a haze of greater than 80% by controlling the particle concentration, while no TOSPEARL® particles have a transmission of greater than 90% even for particles with a haze of greater than 80% even by controlling particle concentration. FIG. 7 also shows data indicating PMMA polished and silicone polished particles having a transmittance of about 91% and a haze of about 15%. The aforesaid matte and polished surfaces are defined by gloss values according to ASTM standard D523 where the polished surface has a gloss value of over 90 and a matte surface has a gloss value of under 50.

Figure 9:
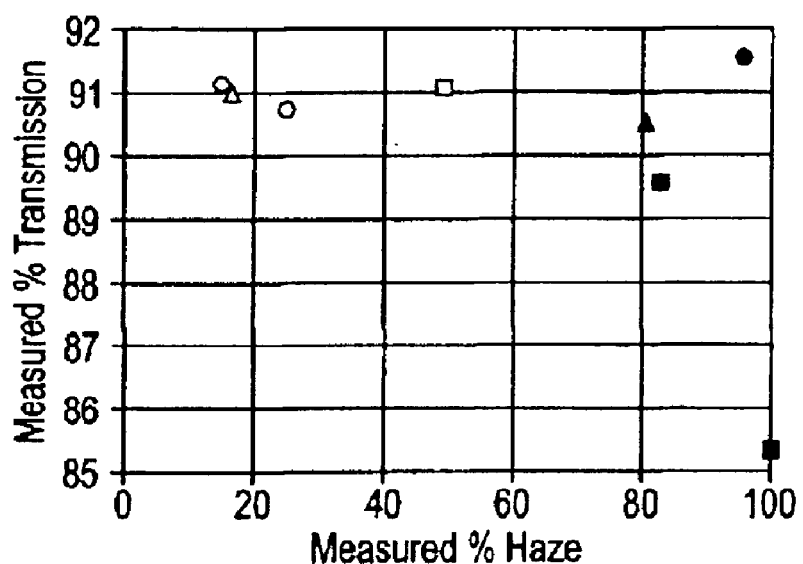
FIG. 9 is a graphical representation of the measured percent transmission of light vs the measured percent haze for PMMA and TOSPEARL® particles distributed in a polycarbonate film or optical sheet material according to particle concentration and mean diameter size.

FIG. 9 is a graphical representation of the measured percent transmission of light through a 0.178 mm thick polycarbonate film vs the measured percent haze thereof for PMMA and TOSPEARL® particles distributed in a polycarbonate film or optical sheet material according to particle concentration and mean diameter size. In FIG. 9, for PMMA particles, by increasing the particle concentration from 0.2% to 2.2%, while maintaining the mean particle size at either 2.4 micrometers or 5.0 micrometers, the transmission increased, or only decreased slightly, with an increase in haze. In particular, a PMMA particle concentration of 2.2% and a mean particle size of 2.4 micrometers (•) or a PMMA particle concentration of 2.2% and 5.0 micrometers (▲) possesses a measured haze of greater than 80% and a measured transmission of greater than 90%. In contrast, for TOSPEARL® particles, by increasing the particle concentration from 0.2% to 2.2%, while maintaining the mean particle size at either 2.0 micrometers or 4.5 micrometers, the transmission decreased, even though there was an increase in haze. However, a TOSPEARL® particle concentration of 2.2% and a mean particle size of 4.5 micrometers (♦), possesses a measured haze of greater than 80% though still possessing a measured transmission of greater than 89%. Also seen in FIG. 9 is data indicating a TOSPEARL® concentration of about 0.2% and a 4.5 micrometer size having a haze of about 15% and a transmittance of about 91%, as well as a PMMA concentration of 0.2% and 5.0 micrometer size having a haze of about 17% and a transmittance of about 91%.

FIGS. 7 and 9 thus show that PMMA particles (with both matte and polished surfaces) suspended in a polycarbonate film at a selected particle concentration of about 2.2% and a mean particle size of either 2.4 micrometers or 5.0 micrometers are a good candidate for effecting the necessary light diffusion properties in display devices.

Thus, based upon the foregoing description a bulk light diffuser as a polycarbonate film or optical sheet material or optical substrate has been described comprising about 95 to about 99.8 percent by weight of a polycarbonate and about 0.2 to about 5 percent by weight of light diffusing particles, based on the total weight of the polycarbonate and the light diffusing particles. In another embodiment, the light diffusing particles are present in an amount of about 2.2% to about 2.5%. based on the total weight of the polycarbonate and the light diffusing particles. Other components maybe present in the polycarbonate compositions in minor amounts, as long as such components do not adversely affect the physical properties of the composition, such that the bulk light diffuser consists essentially of the polycarbonate and the light diffusing particles. Preferably the light diffusing particles comprise a polymer selected from the group consisting of poly(methyl methacrylate), hydrolyzed poly(methyl trialkoxysilane), and mixtures thereof. The sheet material has a percent transmittance of at least 70% and a haze of at least 10% measured according to ASTM standard D 1003-00.

The description of the invention herein discloses a polymer particle concentration ρ, a sheet material thickness, t, and a mean particle size, s, to achieve a preferred sheet material having optical properties of at least 70% transmission and at least 10% haze, a more preferred sheet material having optical properties of at least 90% transmission and at least 80% haze, and a most preferred sheet material having optical properties of at least 90% transmission and at least 90% haze, for a polymer such as a poly(acrylate), a poly (alkyl methacrylate), a hydrolyzed poly(alkyl trialkoxysilane), or a mixture thereof, wherein alkyl is defined as $C_1$–$C_{12}$ alkyl, and the particles are suspended within a polycarbonate. However, it will be understood by those skilled in the art that the aforesaid particle concentration ρ, sheet material thickness, t, and mean particle size, s, can be manipulated either separately or in combination so as to achieve the preferred, more preferred and most preferred transmission and haze.

Embodiments of the bulk light diffuser material as a polycarbonate film or optical sheet material have been described with respect to backlight displays or the like. Such bulk diffusion may also be attained by adding the light diffusion particles to either the upper or lower substrate containing liquid crystal material, or both in an LCD. This can result in increased view angle and decreased artifacts from pixel boundaries. The bulk diffusion of light may also be accomplished by adding the light diffusion particles to the reflective surface 106 positioned along the light guide 104 or to the light guide 104 in an edge-lit backlight or frontlight assembly. The optical sheet material can replace surface texture type of diffusers in existing backlight devices or may be included in such diffusers as well as in brightness enhancement films or light turning films.

Any references to first, second, etc. or to front and back, right and left, top and bottom, upper and lower, horizontal and vertical, or any other similar type of designation indicating a relative position between two or more quantities or objects are, unless noted otherwise, intended for convenience of description, not to limit the present invention or its components to any one positional or spatial orientation. All dimensions of the components in the attached Figures can vary with a potential design and the intended use of an embodiment without departing from the scope of the invention.

While the invention has been described with reference to several embodiments thereof, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A bulk light diffuser material comprising:
   about 95 to about 99.8 percent by weight of a polycarbonate and about 0.2 to about 5 percent by weight of light diffusing particles, based on the total weight of the polycarbonate and of the light diffusing particles, wherein the light diffusing particle have a refractive index of 1.43 to 1.49; and
   wherein the bulk light diffuser material has a percent transmittance of at least 70% and a haze of at least 10%.

2. The bulk light diffuser material as set forth in claim 1 wherein the light diffusing particles comprise a poly(alkyl methacrylate), a poly (tetrafluoroethylene), or mixtures thereof, wherein the alkyl groups of the poly(alkyl methacrylate) have one to about twelve carbon atoms.

3. The bulk light diffuser material as set forth in claim 2 wherein the poly(alkyl methacrylate) comprises poly(methyl methacrylate).

4. The bulk light diffuser material as set forth in claim 2, wherein the light diffusing particles comprise hydrolyzed poly(alkyl trialkoxysilanes), wherein the alkyl groups have one to about twelve carbon atoms.

5. The bulk light diffuser material as set forth in claim 1 wherein the light diffusing particles have a mean particle size of about 1.0 micrometer to about 10.0 micrometers.

6. The bulk light diffuser material as set forth in claim 1, wherein the light diffusing particles are present in an amount of about 2.2% to about 2.5% based on the total weight of the polycarbonate and the light diffusing particles.

7. The bulk light diffuser material as set forth in claim 1 wherein the bulk light diffuser material is in the form of a film or sheet.

8. The bulk light diffuser material as set forth in claim 7 wherein the film or sheet has a thickness of about 0.025 mm to about 0.5 mm.

9. The bulk light diffuser material as set forth in claim 1 wherein the light diffusing particles are matte surface poly(methyl methacrylate) particles that have a gloss value of less than about 50.

10. The bulk light diffuser material as set forth in claim 1 wherein the light diffusing particles are polished surface poly(methyl methacrylate) particles that have a gloss value of greater than about 90.

11. A backlight display device comprising:
    an optical source for generating light;
    a light guide for guiding the light therealong;
    a reflective device positioned along the light guide for reflecting the light out of the light guide; and
    a bulk light diffuser material receptive of the light from the light guide, the bulk light diffuser material comprising:
    about 95 to about 99.8 percent by weight of a polycarbonate and about 0.2 to about 5 percent by weight of light diffusing particles, based on the total weight of the polycarbonate and of the light diffusing particles, wherein the light diffusing particles have a refractive index of 1.43 to 1.49; and
    wherein the bulk light diffuser material has a percent transmittance of at least 70% and a haze of at least 10%.

12. The backlight display device as set forth in claim 11 wherein the light diffusing particles comprise a poly(alkyl methacrylate), a poly (tetrafluoroethylene), or mixtures thereof, wherein the alkyl groups of the poly(alkyl methacrylate) have one to about twelve carbon atoms.

13. The backlight display device as set forth in claim 12 wherein the poly(alkyl methacrylate) comprises poly(methyl methacrylate).

14. The backlight display device as set forth in claim 13 wherein poly(methyl methacrylate) particles are matte surface poly(methyl methacrylate) particles that have a gloss value of less than about 50.

15. The backlight display device as set forth in claim 13 wherein the poly(methyl methacrylate) particles are polished surface poly(methyl methacrylate) particles that have a gloss value of greater than about 90.

16. The backlight display device as set forth in claim 12 wherein the light diffusing particle comprises hydrolyzed poly(alkyl trialkoxysilanes), wherein the alkyl groups have one to about twelve carbon atoms.

17. The backlight display device as set forth in claim 11 wherein the light diffusing particles have a mean particle size of about 1.0 micrometer to about 10.0 micrometers.

18. The backlight display device as set forth in claim 11 wherein the light diffusing particles are present in an amount of about 2.2% to about 2.5% based on the total weight of polycarbonate and the light diffusing particles.

19. The backlight display device as set forth in claim 11 wherein the bulk light diffuser material is in the form of a film or sheet.

20. The backlight display device as set forth in claim 19 wherein the film or sheet has a thickness of about 0.025 mm to about 0.5 mm.

21. The backlight display device as set forth in claim 19 wherein the film or sheet includes a prismatic surface.

22. The backlight display device as set forth in claim 19 wherein the film or sheet includes a planar surface.

23. A bulk light diffuser material comprising:
    about 95 to about 99.8 percent by weight of a polycarbonate and about 0.2 to about 5 percent by weight of light diffusing particles, based on the total weight of the polycarbonate and of the light diffusing particles, wherein the difference between the refractive index of the polycarbonate and the refractive index of the light diffusing particles is about 0.1 to about 0.16; and
    wherein the bulk light diffuser material has a percent transmittance of at least 70% and a haze of at least 10%.

24. The bulk light diffuser material of claim 23 wherein the light diffusing particle comprises polymethyl methacrylate.

25. The bulk light diffuser material of claim 23 wherein the light diffusing particle comprises a hydrolyzed poly(alkyl trialkoxysilane), wherein the alkyl groups have one to about twelve carbon atoms.

26. A bulk light diffuser material comprising:

about 95 to about 99.8 percent by weight of a polycarbonate and about 0.2 to about 5 percent by weight of light diffusing particles, based on the total weight of the polycarbonate and of the light diffusing particles; wherein the light diffusing particles comprise poly(methyl methacrylate), hydrolyzed poly(alkyl trialkoxysilane) or combinations thereof; and wherein the bulk light diffuser material has a percent transmittance of at least 70% and a haze of at least 10%.

27. A backlight display device comprising:

an optical source for generating light;

a light guide for guiding the light therealong;

a reflective device positioned along the light guide for reflecting the light out of the light guide; and a bulk light diffuser material receptive of the light from the light guide, the bulk light diffuser material comprising:

about 95 to about 99.8 percent by weight of a polycarbonate and about 0.2 to about 5 percent by weight of light diffusing particles, based on the total weight of the polycarbonate and of the light diffusing particles, wherein the difference between the refractive index of the polycarbonate and the refractive index of the light diffusing particles is about 0.1 to about 0.16; and wherein the bulk light diffuser material has a percent transmittance of at least 70% and a haze of at least 10%.

28. The bulk light diffuser material of claim 27 wherein the light diffusing particle comprises polymethyl methacrylate.

29. The bulk light diffuser material of claim 27 wherein the light diffusing particle comprises a hydrolyzed poly(alkyl trialkoxysilane), wherein the alkyl groups have one to about twelve carbon atoms.

30. A backlight display device comprising:

an optical source for generating light;

a light guide for guiding the light therealong;

a reflective device positioned along the light guide for reflecting the light out of the light guide; and a bulk light diffuser material receptive of the light from the light guide, the bulk light diffuser material comprising:

about 95 to about 99.8 percent by weight of a polycarbonate and about 0.2 to about 5 percent by weight of light diffusing particles, based on the total weight of the polycarbonate and of the light diffusing particles, wherein the light diffusing particles comprise poly(methyl methacrylate), hydrolyzed poly(alkyl trialkoxysilane) or combinations thereof; and wherein the bulk light diffuser material has a percent transmittance of at least 70% and a haze of at least 10%.

* * * * *